United States Patent [19]

Hagi et al.

[11] Patent Number: 5,145,706
[45] Date of Patent: Sep. 8, 1992

[54] METHOD FOR PREPARATION OF PLASMA POWDER AND PRODUCT THEREOF

[75] Inventors: Takashi Hagi, Yokkaichi; Kouichi Misawa, Yokohama; Shuji Saito, Fujisawa; Yuji Sakamoto, Yokkaichi; Noriaki Kadota, Mie; Yoshiro Toda, Suzuka; Nagataka Yamazaki, Yokkaichi, all of Japan

[73] Assignee: Taiyo Kagaku Co., Ltd., Mie, Japan

[21] Appl. No.: 676,303

[22] Filed: Mar. 28, 1991

[51] Int. Cl.$^5$ ........................ A23L 1/311; A23L 1/313
[52] U.S. Cl. .................................. 426/647; 426/423; 426/471; 426/652; 530/364
[58] Field of Search ............... 426/271, 471, 647, 652, 426/423; 210/691; 530/364, 369, 380

[56] References Cited

U.S. PATENT DOCUMENTS

| | | | |
|---|---|---|---|
| 3,083,194 | 3/1963 | Thies et al. | 426/423 X |
| 3,950,555 | 4/1976 | Stromberg | 426/647 X |
| 4,610,814 | 9/1986 | Dede et al. | 426/647 X |
| 4,986,998 | 1/1991 | Yoo et al. | 426/647 |

FOREIGN PATENT DOCUMENTS

| | | |
|---|---|---|
| 3-19657 | 1/1991 | Japan . |
| 90/05461 | 5/1990 | World Int. Prop. O. ........ 426/647 |

OTHER PUBLICATIONS

Hayakawa et al, Nippon Shokuhin Kogyo Gakkaishi, vol. 36, No. 7, pp. 531–537 (1989).

*Primary Examiner*—Arthur L. Corbin
*Attorney, Agent, or Firm*—Birch, Stewart, Kolasch & Birch

[57] ABSTRACT

The present invention relates to a method for preparation of plasma powder characterized by catalytic treatment of plasma with colloidal silica and subsequent powdering of the plasma. The plasma powder thus obtained by the present invention is substantially free of malodorous substances.

10 Claims, No Drawings

METHOD FOR PREPARATION OF PLASMA POWDER AND PRODUCT THEREOF

BACKGROUND OF THE INVENTION

1. Field of the Invention

The present invention relates to a method for preparation of plasma powder, more specifically to a method for preparation of plasma powder which is substantially free of malodorous substances.

At present, plasma powder prepared from plasma of bovines, swine and other animals are used mainly as a food quality improver for ham, sausages and other foods. However, since plasma powder characteristically has a nasty odor and taste, it can be used only in such very small amounts that its addition does not affect the flavor of food. It is therefore demanded that plasma powder having no malodor and improved taste be provided.

The method for preparation of plasma powder of the present invention provides plasma powder having no malodor and improved taste which does not adversely affect the flavor of food.

2. Description of the Prior Art

Blood of a bovine, swine or other animal is collected at a slaughterhouse. The collected blood is immediately supplemented with sodium citrate to prevent its coagulation, after which it is centrifuged to separate plasma and blood cells. Since liquid plasma is not easy to handle and has drawbacks in storage and distribution due to bacterial contamination etc., it is common practice to powder the plasma by spray drying or another means.

Traditionally, powdering has been carried out by drying plasma either directly after its separation from blood or after pretreatment by ultracentrifugation. Also, investigations have been made on deodorization with activated charcoal, but this method remains undeveloped.

However, the conventional plasma powder thus obtained has a characteristic undesirable odor and taste. The bad odor and taste become stronger with the elapse of time, such that, the commercial plasma powder products all have a nasty odor and taste after a given period following preparation even if the initial odor and taste were weak. Plasma powder is used as a food quality improver, particularly for the purpose of water retention and elasticity enhancement, but the amount of its addition is limited. Accordingly, the obtained effect is often unsatisfactory, since if it were added in large amounts, the flavor of food would be affected by the nasty odor and taste described above. It is therefore needed to produce plasma powder having no malodor and improved taste which does not spoil the flavor of food.

SUMMARY OF THE INVENTION

It is an object of the present invention to provide a method for preparation of plasma powder which is substantially free of malodorous substances. It is another object of the present invention to provide plasma powder which is substantially free of malodorous substances.

Plasma powder contains substances which cause the generation of malodor: it is speculated that these substances are phospholipids and free fatty acids as plasma components. The present inventors investigated various treating methods, such as decomposition and adsorption for removal of the malodorous substances, and found a method in which the malodorous substances are removed by adsorption to colloidal silica and the resulting supernatant is dried to powder as the most economical method, and thus developed the present invention.

Accordingly, the gist of the present invention relates to a method for preparation of plasma powder characterized by catalytic treatment of plasma with colloidal silica and subsequent powdering of the plasma, and to the plasma powder obtained by said method which is substantially free of malodorous substances.

DETAILED DESCRIPTION OF THE INVENTION

There is no limitation on the origin of the plasma used for the present invention, as long as it is utilized as plasma powder, but it is the common practice to derive the plasma from blood of bovine, swine or other animals.

Examples of the colloidal silica normally used for the present invention includes silica gel, light silicic anhydride and acid clay; at least one kind is selected from the group comprising these kinds of colloidal silica for use for the present invention. In other words, these substances may be used singly or in combination of two or more kinds. Of these substances, light silicic anhydride is preferred from the viewpoint of malodorous substance adsorptivity. Examples of the combination of two or more kinds include a combination of light silicic anhydride and silica gel.

These kinds of colloidal silica used for the present invention are known per se and are readily available.

In the catalytic treatment for the present invention, plasma is treated with colloidal silica in an amount of normally 1 to 150 g, preferably 5 to 50 g, per liter of plasma, at a pH of normally 3 to 9, preferably 6 to 8, at a treating temperature of normally 5° to 60° C., preferably 5° to 30° C., for a treating time of normally 5 to 180 minutes, preferably 60 to 90 minutes.

If the amount of colloidal silica is below 1 g, the obtained deodorizing effect will be unsatisfactory, and if it exceeds 150 g, no corresponding effect will be obtained; therefore, these amounts are undesirable from the viewpoint of economy.

If the pH is below 3, plasma protein will become insoluble, and if it exceeds 9, colloidal silica will dissolve; therefore, these pH levels are undesirable.

If the treating temperature is below 5° C., the obtained deodorizing effect will be unsatisfactory, and if it exceeds 60° C., plasma protein will become insoluble; therefore, these temperatures are undesirable.

If the treating time is shorter than 5 minutes, the obtained deodorizing effect will be unsatisfactory, and if it is longer than 180 minutes, no corresponding effect will be obtained; therefore, these times are undesirable.

Treatment can be carried out by the batch method or column method, with preference given to the batch method. In the case of the batch method, colloidal silica is added to plasma in a container such as a stainless steel tank, and agitation is made for 2 to 40 minutes, followed by a known separating process such as filtration or centrifugation to remove the colloidal silica to yield a supernatant. This supernatant, which is substantially free of the malodorous substances, is dried to powder by a known conventional method such as spray drying. Spray drying is carried out using, for example, a spray drier. In the case of column method, the catalytic treatment comprises a process of pass of plasma through a column filled with colloidal silica. Note that the method for preparation of plasma powder of the present invention can also be employed as a process of known plasma purification methods. For example, it may be combined with other methods such as ultrafiltration, activated charcoal treatment and ion exchanger treatment.

Specifically, it can be carried out in the order of the method for preparation of plasma powder of the present invention, activated charcoal treatment and ultrafiltration.

In the case of the column method, it can be carried out in the order of the method for preparation of plasma powder of the present invention, activated charcoal column treatment and ion exchanger column treatment.

The plasma powder obtained by the present invention has an improved odor and taste in comparison with the conventional plasma powder, and it generates no nasty odor or taste even after storage for 6 months. Also, as is evident from the test examples given below, it does not adversely affect the flavor of food even when it is added to the food. It is therefore possible to add the plasma powder in large amounts, and the plasma powder serves well as a food quality improver.

In addition, the plasma powder of the present invention can be used in foods to which the conventional plasma powder cannot be added due to nasty odor and taste, such as noodles and cakes, thus offering a potential for utilization of plasma powder for new uses; therefore, it is expected that the demand for plasma powder will be expanded.

EXAMPLES

The present invention is hereinafter described in more detail by means of the following working examples and test examples, but these examples are not to be construed as limitative on the present invention.

EXAMPLE 1

To 10 l of fresh blood collected from a bovine immediately after its slaughter, 1 of a 1% by weight aqueous solution of sodium citrate was added, followed by centrifugation at 5000 rpm for 10 minutes to separate the plasma. Then, light silicic anhydride was added in a ratio of 10 g per liter of this plasma. After stirring at room temperature for 5 minutes (pH 7.0), centrifugation was carried out, and the resulting supernatant was spray dried to yield 300 g of plasma powder. This powder had no malodor.

COMPARATIVE EXAMPLE 1

To 10 l of fresh blood collected from a bovine immediately after its slaughter, 1 of a 1% by weight aqueous solution of sodium citrate was added, followed by centrifugation at 5000 rpm for 10 minutes to separate the plasma. Then, this plasma was spray dried as such to yield 320 g of plasma powder. This powder had a characteristic malodor.

TEST EXAMPLE 1

The plasma powder of the present invention obtained in Example 1 and the conventional plasma powder obtained in Comparative Example 1 were each added to the following formula of hamburger in a ratio of 1%. The hamburger products were then prepared by an ordinary method and compared with each other as to flavor and taste. The results of the sensory evaluation test are given in Table 1.

FORMULA OF HAMBURGER

| Minced beef | 100 parts |
| --- | --- |
| Onion | 14 parts |
| Bread crumbs | 7 parts |
| Egg | 7 parts |
| Seasoning, spice | 5 parts |
| Common salt | 0.5 part |

TABLE 1

|  | Taste | Flavor |
| --- | --- | --- |
| Plasma powder not added | ○ | — |
| Plasma powder of the present invention added | ⊙ | — |
| Conventional plasma powder added | ⊙ | + |

Evaluation criteria
⊙: Very good
○: Good
—: No malodor
+: Malodor

EXAMPLE 2

In the same manner as in Example 1, 290 g of plasma powder was obtained using light silicic anhydride in an amount of 5 g per liter of plasma derived from fresh blood collected from a swine immediately after its slaughter. This powder had no malodor.

TEST EXAMPLE 2

The plasma powders obtained in Examples 1 and 2 were stored at 30° C. for 6 months and then examined for odor. Table 2 gives the results of sensory evaluation of the strength of malodor. For evaluation criteria, the average value was obtained for each case with a maximum score of 50 and a minimum score of 0.

TABLE 2

|  | Immediately after powdering | After storage at 30° C. for 6 months |
| --- | --- | --- |
| Example 1 | 0.5 | 0.7 |
| Example 2 | 1.0 | 1.2 |
| Conventional plasma powder | 12.0 | 30.0 |

Either of the plasma powders obtained in Examples 1 and 2 had no malodor even after storage for 6 months.

We claim:

1. A method for producing plasma powder that is substantially free of malodorous substances comprising: catalytically treating plasma with colloidal silica selected from the group consisting of silica gel, light silicic anhydride, and combinations thereof; and powdering said treated plasma.

2. The method according to claim 1 wherein said plasma is derived from blood of bovine or swine.

3. The method according to claim 1 wherein said catalytic treatment comprises adding colloidal silica to plasma and agitating the plasma and colloidal silica mixture.

4. The method according to claim 3 wherein the amount of said colloidal silica is from 1 to 150 g per liter of plasma.

5. The method according to claim 1 wherein said catalytic treatment comprises a process of passing said plasma through a column filled with colloidal silica.

6. The method according to claim 1 which comprises powdering said plasma by a spray drier.

7. The method according to claim 1, wherein the temperature of said treating step is from 5° to 60° C.

8. The method according to claim 7, wherein the temperature of said treating step is from 5° to 30° C.

9. The method according to claim 1, wherein the treating time of said treating step is from 5 to 180 minutes.

10. A plasma powder that is substantially free of malodorous substances, wherein said powder is prepared by catalytically treating plasma with colloidal silica selected from the group consisting of silica gel, light silicic anhydride, and combinations thereof and subsequently powdering said treated plasma.

* * * * *